May 27, 1969     C. T. HOARD     3,446,522

INTERNAL RETAINING RING

Filed May 12, 1967

INVENTOR.
CHARLES T. HOARD
BY

ATTORNEY.

United States Patent Office 3,446,522
Patented May 27, 1969

3,446,522
INTERNAL RETAINING RING
Charles T. Hoard, Oakland, Calif., assignor to the United States of America as represented by the Atomic Energy Commission
Filed May 12, 1967, Ser. No. 639,253
Int. Cl. F16d 1/06; B60b 27/06; F16c 3/10
U.S. Cl. 287—52                              6 Claims

ABSTRACT OF THE DISCLOSURE

A locking retaining ring which may be made of a flexible, inelastic material is radially severed. One end is partially cutaway so as to terminate in a flexible tab that extends along the internal circumference of the ring into engagement with the opposite end to lock the ring in its fully expanded position in a mating groove. The tab may be bent clear of the opposite end to permit contraction of the ring to a smaller diameter to permit its insertion into or removal from the groove.

Background of the invention

The invention disclosed herein was made under, or in, the course of Contract No. AT(04-3)-400 with the United States Atomic Energy Commission.

This invention relates to retaining rings, and more particularly to a one-piece internal locking retaining ring.

In arrangements requiring the use of internal retaining rings, it is known to use either commonly available spring snap rings, spiral spring locking rings, or two-piece tab locking snap rings.

Although these known retaining rings are often satisfactory, they have been found inadequate for many installations. For example, spring retaining rings made of metal are susceptible to deterioration in a corrosive environment. For rings to be installed in a radioactive environment, it is desirable that the choice of ring material be one having a high resistance to the type of radioactivity to which it is to be exposed without regard to the usual requirements of ring material. Other installations require the use of nonmagnetic materials for which most retaining rings are unsuitable. Moreover, it is sometimes desirable to devise an assembly for use in a vacuum environment, which assembly must be baked out prior to its final installation. Such a baking would cause the elastic force in a spring retaining ring to relax and thereby become ineffective for retaining parts. Still other installations require the use of retaining rings in hard-to-reach, deep internal locations or other locations having limited access where it has been found difficult and sometimes impossible to install and remove known retaining rings. In installing or removing spring retaining rings, it is necessary not only to work against the force of the spring, but also to manipulate the spring into place. Furthermore, common internal spring snap rings generally have protuberances which may interfere with adjacent radial protuberances to cause the ring to snap out of place. In any event, snap retaining rings are not locking rings and tend to disengage their grooves upon being subjected to vibration and axial forces. Two-piece locking snap rings such as found in U. S. Patent No. 2,960,359 would be difficult to install because of the alignment and manipulation required of the two pieces.

Summary of the invention

According to the invention, a one-piece retaining ring is formed to have two ends. The ring is made of a flexible material, and may be arranged to have locking means extending from one end for engagement and disengagement with the other end to permit contraction of the ring for insertion into an internal groove and expansion of the ring into the groove for positive locking therein by the locking means. The material of which the retaining ring is made is not critical to its general function, provided the ring is flexible in the radial direction and stiff in the axial direction. The ring, therefore, may be made of a material suitable for a specific installation which, for example, may require a corrosion-resistant material, a radiation-resistant material, or a nonmagnetic material. Furthermore, the ring may be made to have a constant width with no protuberances, thereby making it especially suitable for installations having close radial tolerances. Since the retaining ring may be made of a flexible but inelastic material, and since there is only one piece to manipulate, it has been found very easy to install and remove even in internal locations of limited access in which known retaining rings were installed and removed only with extreme difficulty.

It is an object of the invention to provide a one-piece positive locking internal retaining ring.

Another object is to provide a retaining ring that may be made of a wide range of materials.

Another object is to provide an internal retaining ring that may be made of a material especially suitable for installation in a specific environment.

Another object is to minimize the manipulation required for installation and removal of an internal retaining ring in an internal location of limited access.

Other objects and advantageous features of the invention will be apparent in a description of a specific embodiment thereof, given by way of example only, to enable one skilled in the art to readily practice the invention, and described hereinafter with reference to the accompanying drawing.

Description of an embodiment

Figure 1:
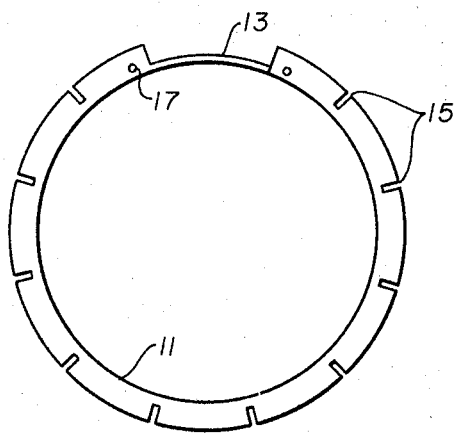
FIGURE 1 is a front view of a retaining ring, constructed according to the invention, and shown in its normal position.
Figure 2:
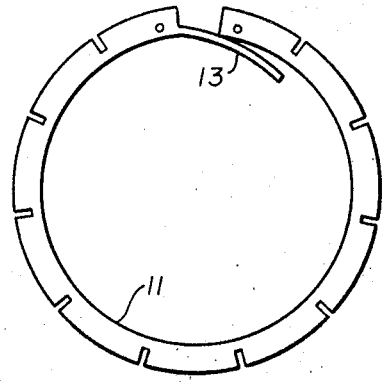
FIGURE 2 is a front view of the retaining ring of FIGURE 1, shown in a contracted position.

A one-piece retaining ring 11 is shown in FIGURE 1 in its normal position according to the invention. The ring is split to have separable ends. One end of the ring terminates in a locking tab 13 which engages the opposite end of the ring with the ring in its normal position as shown in FIGURE 1. In order to contract the ring for insertion into or removal from an internal groove, the tab 13 is flexed radially inward beneath the opposite end to permit the contraction. The position of the ring in its contracted position is illustrated in FIGURE 2. Spaced-apart slots 15 may be cut into the periphery of the ring to facilitate its contraction. A small hole 17 is provided in each end of the ring for insertion of a spanner tool for remote manipulation of the ring in a deep hole. The holes 17 may be made very small when a flexible but inelastic material is used, since the force required to bend the ring is small. The ring 11, therefore, does not require radially protruding ends. After being inserted in an internal mating groove, the ring is expanded to its normal position by means of the spanner tool, and the tab 13 is bent radially outward to its normal position for re-engagement with the opposite end of the ring to positively lock the ring in the groove. The tab 13 may be shaped to have a radial thickness such that a slot exists between the hole wall and the tab. A tool may be conveniently inserted into the slot for bending the tab clear of the opposite end to permit contraction and removal of the ring.

Although the ring 11 could be made of a spring material, it is advantageous to make the ring of a flexible, but inelastic material so that the tab 13 may be easily bent inward to the position shown in FIGURE 2 and freely maintained in that position without use of other means. Also, when made of such material, the ring, once contracted, will remain contracted without the use of other means. The ring therefore may be easily inserted into and removed from a mating groove since there is no spring pressure to overcome during manipulation of the ring. Upon being placed in the groove, the ring 11 may be easily bent to its original position. The tab 13 may then be returned to its original position to positively lock the ring in place.

Figure 3:
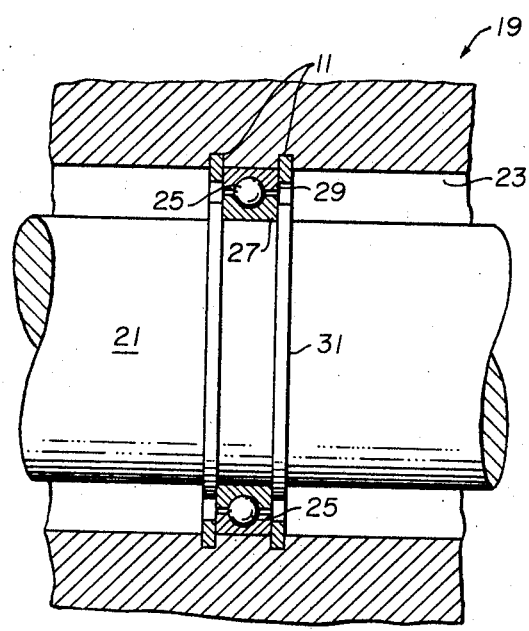
FIGURE 3 is a side view, partially in cross section, of an assembly utilizing the retaining ring of FIGURE 1 in an internal location of limited access.

In FIGURE 3 is shown an assembly 19 in which the retaining ring 11 would be especially useful. The assembly 19 comprises a shaft 21 mounted for rotation in a hole 23 by means of ball bearings 25 in a race comprising an inner part 27 and an outer part 29. The part 27 may be held in place by conventional external snap retaining rings 31, while the outer part may be conveniently held in place by the retaining rings 11. In such an assembly, not only are the rings 11 easily installed and removed, but are especially suitable for avoiding contact between the rings 11 and radial protuberances which normally extend from the snap retaining rings 31.

A retaining ring exemplifying the invention has been constructed by cutting a .092" section from a length of annealed stainless steel tubing having an inside diameter of 2.5" and an outside diameter of 2.91". The ring was split to have two ends, and one was shaped to have a tab .875" long with a radial thickness of .040". Radial slots .140" deep were cut in the periphery of the ring. A .047" diameter spanner hole was drilled in each end of the ring. Such a ring is suitable for installation in a mating groove cut in a 2.72" diameter hole, thus exposing the spanner holes and also a slot between the locking tab and the wall of the hole.

I claim:
1. A retaining ring for use in an internal location, said ring having two spaced ends with opposed planar surfaces, an arcuate tab integral with one of said planar surfaces and having a free end with a planar surface extending into abutting engagement with the other of said opposed planar surfaces, said arcuate tab being integral with said one planar surface at its point of intersection with the inner periphery of said ring and said free end planar surface engaging the other of said opposed planar surfaces at its point of intersection with the inner periphery of said ring; the inner periphery of said tab having the same radius as the inner periphery of said ring and the radial thickness thereof being less than that of said ring so as to provide for said tab being radially flexible at the point of its connection to said ring, said tab being movable radially inward to a position clear of said other end to permit circumferential contraction of said ring to a reduced diameter that enables insertion and removal of said ring in said location, said tab being movable radially outward into normal blocking engagement with said other end when said ring is expanded in said location, said tab being effective when in blocking engagement with said other end to resist circumferential contraction of said ring and thereby positively lock said ring in said internal location.

2. The retaining ring defined in claim 1, wherein the radial width of said ring is constant from one spaced end to the other.

3. The retaining ring defined in claim 1, wherein said tab is shaped to normally form a part of the internal circumference of said ring with said tab in normal blocking engagement with said other end.

4. The retaining ring defined in claim 3, wherein said internal location is a mating groove in a hole and said tab has a radial thickness such that a slot exists between the hole wall and the tab, with the ring in said groove and said tab in said normal position.

5. The retaining ring defined in claim 1, wherein said ring is a single piece of flexible material having the property of independently maintaining a deformed shape.

6. The retaining ring defined in claim 5, wherein the material of said ring is nonmagnetic.

References Cited

UNITED STATES PATENTS

| 366,532 | 7/1887 | Tuerk | 24—279 |
| 482,935 | 9/1892 | Willcoxon | 85—8.8 |
| 1,767,217 | 6/1930 | Kraft | 85—8.8 |
| 2,811,889 | 11/1957 | Wurzel | 287—52 |

FOREIGN PATENTS 738,643 10/1932 France.

CARL W. TOMLIN, *Primary Examiner.*

ANDREW V. KUNDRAT, *Assistant Examiner.*

U.S. Cl. X.R.

85—8.8